US009859553B2

United States Patent
Morita et al.

(10) Patent No.: US 9,859,553 B2
(45) Date of Patent: Jan. 2, 2018

(54) NEGATIVE ELECTRODE ACTIVE MATERIAL FOR NONAQUEOUS ELECTROLYTE SECONDARY BATTERY, NONAQUEOUS ELECTROLYTE SECONDARY BATTERY, AND BATTERY PACK

(71) Applicant: KABUSHIKI KAISHA TOSHIBA, Minato-ku, Tokyo (JP)

(72) Inventors: Tomokazu Morita, Chiba (JP); Takashi Kuboki, Tokyo (JP); Takayuki Fukasawa, Kanagawa (JP); Yasuyuki Hotta, Tokyo (JP); Yasuhiro Goto, Tokyo (JP); Toshiro Hiraoka, Kanagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 195 days.

(21) Appl. No.: 14/496,074

(22) Filed: Sep. 25, 2014

(65) Prior Publication Data
US 2015/0037681 A1 Feb. 5, 2015

Related U.S. Application Data

(63) Continuation of application No. PCT/JP2012/057831, filed on Mar. 26, 2012.

(51) Int. Cl.
*H01M 4/48* (2010.01)
*H01M 4/36* (2006.01)
(Continued)

(52) U.S. Cl.
CPC .......... *H01M 4/364* (2013.01); *H01M 4/133* (2013.01); *H01M 4/386* (2013.01); *H01M 4/48* (2013.01);
(Continued)

(58) Field of Classification Search
None
See application file for complete search history.

(56) References Cited

U.S. PATENT DOCUMENTS

| 7,303,838 B2 | 12/2007 | Morita et al. |
| 2003/0129494 A1 | 7/2003 | Kaneda et al. |
| 2003/0215711 A1 | 11/2003 | Aramata et al. |
| 2006/0068287 A1 | 3/2006 | Morita et al. |
| 2010/0075227 A1 | 3/2010 | Morita et al. |

FOREIGN PATENT DOCUMENTS

| JP | 2000-90916 A | 3/2000 |
| JP | 2000-90924 A | 3/2000 |

(Continued)

OTHER PUBLICATIONS

International Search Report from PCT/JP2012/057831 dated Jul. 3, 2012, 3 pages.

(Continued)

*Primary Examiner* — Tracy Dove
(74) *Attorney, Agent, or Firm* — Ohlandt, Greeley, Ruggiero & Perle, L.L.P.

(57) ABSTRACT

A negative electrode active material for a nonaqueous electrolyte secondary battery of an embodiment includes a carbonaceous material, a silicon oxide phase in the carbonaceous material, and a silicon phase in the silicon oxide phase. The negative electrode active material has a crack in the carbonaceous material, and the longest side of the crack has a length equal to or greater than $\frac{1}{5}$ of the diameter of the negative electrode active material.

18 Claims, 6 Drawing Sheets

(51) Int. Cl.
*H01M 4/38* (2006.01)
*H01M 4/485* (2010.01)
*H01M 4/587* (2010.01)
*H01M 4/133* (2010.01)
*H01M 4/583* (2010.01)
*H01M 10/052* (2010.01)
*H01M 4/02* (2006.01)

(52) U.S. Cl.
CPC ........... *H01M 4/485* (2013.01); *H01M 4/583* (2013.01); *H01M 4/587* (2013.01); *H01M 10/052* (2013.01); *H01M 2004/027* (2013.01)

(56) References Cited

FOREIGN PATENT DOCUMENTS

| JP | 2004-119176 A | 4/2004 |
|---|---|---|
| JP | 3960691 | 5/2007 |
| JP | 3973300 | 6/2007 |
| JP | 2008-186732 A | 8/2008 |
| JP | 2012-99452 A | 5/2012 |

OTHER PUBLICATIONS

Japanese Notification of Reasons for Refusal dated Aug. 4, 2015 from corresponding Japanese Patent Application No. 2014-507079, 5 pages.

US 9,859,553 B2

1

NEGATIVE ELECTRODE ACTIVE MATERIAL FOR NONAQUEOUS ELECTROLYTE SECONDARY BATTERY, NONAQUEOUS ELECTROLYTE SECONDARY BATTERY, AND BATTERY PACK

CROSS-REFERENCE TO RELATED APPLICATION

This application is a continuation application based upon and claims the benefit of priority from International Application PCT/JP2012/057831, the International Filing Date of which is Mar. 26, 2012 the entire contents of which are incorporated herein by reference.

FIELD

Embodiments described herein relate to a negative electrode active material for a nonaqueous electrolyte secondary battery, a nonaqueous electrolyte secondary battery, a battery pack and a method for manufacturing a negative electrode active material for a nonaqueous electrolyte secondary battery.

BACKGROUND

In recent years, a variety of portable electronic devices have been becoming widespread owing to rapid development of techniques for downsizing electronic devices. Batteries as power sources for these portable electronic devices are also required to be downsized, and nonaqueous electrolyte secondary batteries having a high energy density receive attention.

Particularly, attempts have been made to use materials having a high lithium absorption capacity and a high density, such as elements that form an alloy with lithium, such as silicon and tin, and amorphous chalcogen compounds. Among them, silicon is capable of absorbing lithium at a ratio of 4.4 lithium atoms per silicon atom, and its negative electrode capacity per mass is about 10 times of that of graphite carbon. However, silicon has a problem in cycle life such that a change in volume associated with insertion and desorption of lithium in the charge-discharge cycle is significant, leading to size reduction of active material particles.

The present inventors have extensively conducted experiments, and resultantly found that an active material formed by combining and firing minute silicon monoxide and a carbonaceous material, wherein microcrystalline Si is dispersed in the carbonaceous material while being encompassed or held in $SiO_2$ that is strongly bound with Si, is obtained, so that capacity enhancement and improvement of cycle characteristics can be achieved. However, even with such an active material, the capacity is reduced when several hundred charge-discharge cycles are performed, and thus life characteristics are not sufficient for long-term use.

Further, the process of a reduction in capacity has been minutely examined, and resultantly it has been found that microcrystalline Si contained in the active material is grown while charge-discharge is repeated, so that the crystallite size increases. There is the problem that influences of a change in volume associated with insertion and desorption of Li during charge-discharge become significant due to the growth of the crystallite size, leading to a reduction in capacity.

DETAILED DESCRIPTION

A negative electrode active material for a nonaqueous electrolyte secondary battery of an embodiment includes a carbonaceous material, a silicon oxide phase in the carbonaceous material, and a silicon phase in the silicon oxide phase. The negative electrode active material has a crack in the carbonaceous material, and the longest side of the crack has a length equal to or greater than ⅕ of the diameter of the negative electrode active material.

A nonaqueous electrolyte secondary battery of an embodiment includes a negative electrode containing a negative electrode active material, a positive electrode containing a positive electrode active material, and a nonaqueous electrolyte. The negative electrode active material includes a carbonaceous material, a silicon oxide phase in the carbonaceous material, and a silicon phase in the silicon oxide phase. The negative electrode active material has a crack in the carbonaceous material. The longest side of the crack has a length equal to or greater than ⅕ of the diameter of the negative electrode active material.

A battery pack of an embodiment uses a nonaqueous electrolyte secondary battery. The nonaqueous electrolyte secondary battery includes a negative electrode containing a negative electrode active material, a positive electrode containing a positive electrode active material, and a nonaqueous electrolyte. The negative electrode active material includes a carbonaceous material, a silicon oxide phase in the carbonaceous material, and a silicon phase in the silicon oxide phase. The negative electrode active material has a crack in the carbonaceous material. The longest side of the crack has a length equal to or greater than ⅕ of the diameter of the negative electrode active material.

A method for manufacturing a negative electrode active material for a nonaqueous electrolyte secondary battery of an embodiment includes mixing $SiO_x$ (0.8≤x≤1.5), a resin, at least one carbon material selected from the group consisting of graphite, coke, low-temperature fired carbon and pitch, and a heat-decomposable polymer, and firing the mixture at 1000° C. or more to 1400° C. or less.

Hereinafter, embodiments will be described with reference to the drawings.

First Embodiment

Figure 1:
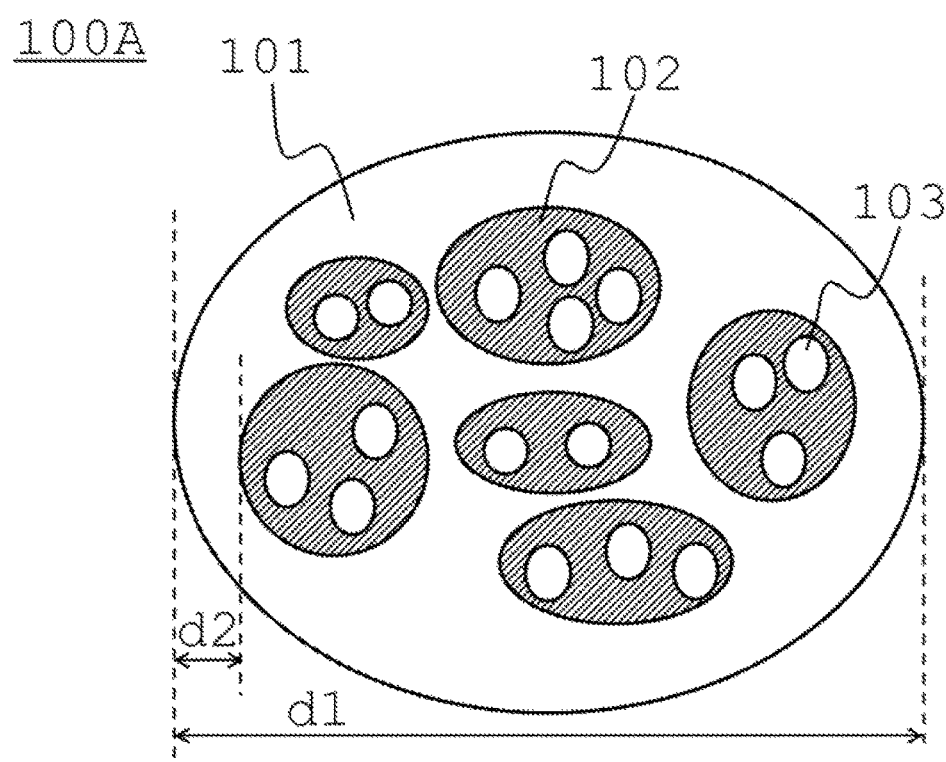
FIG. 1 is a conceptual view of a negative electrode active material of an embodiment.
Figure 2:
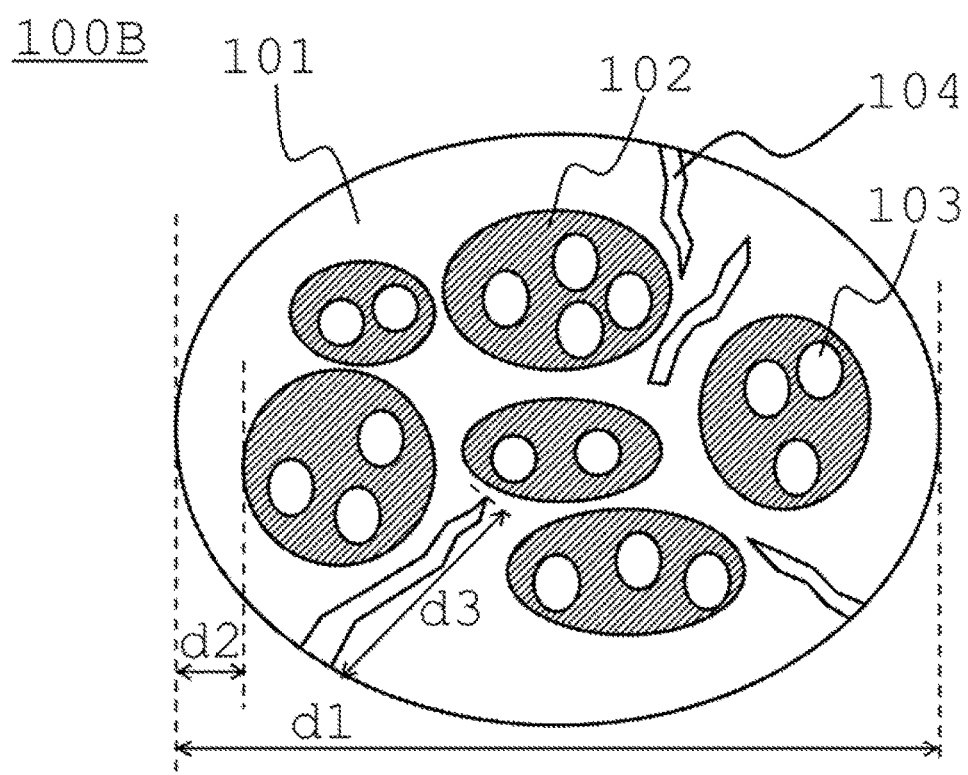
FIG. 2 is a conceptual view of a negative electrode active material of an embodiment.

As shown in the conceptual view of FIG. 1, a negative electrode active material 100A according to the first embodiment includes a carbonaceous material, a silicon oxide phase in the carbonaceous material, and a silicon phase in the silicon oxide phase. The conceptual view of FIG. 2 shows a negative electrode active material 100B having cracks 104. Hereinafter, unless otherwise specified, both negative electrode active materials in FIGS. 1 and 2 will be given symbol 100 because both negative electrode active materials 100A and 100B have the same characteristics.

The negative electrode active material 100 is particles containing silicon that inserts and desorbs Li. Preferably, the negative electrode active material 100 is particles having an average primary particle size of 5 μm or more to 100 μm or less and a specific surface area of 0.5 m$^2$/g or more to 10 m$^2$/g or less. The particle size and the specific surface area of the active material affect the rate of the insertion and desorption reaction of lithium, and have significant influences on negative electrode characteristics, but as long as the particle size and the specific surface area of the active material fall within the above-mentioned range, the characteristics can be stably exhibited. The average primary particle size is determined by averaging the particle sizes of 10 negative electrode active materials randomly selected from a SEM (Scanning Electron Microscope) picture. The specific surface area is determined by performing pore distribution measurement using a mercury penetration method.

A carbonaceous material 101 of the embodiment is a conductive material, and is combined with a silicon oxide phase 102. The carbonaceous material 101 forms a negative electrode active material. As the carbonaceous material 101, at least one selected from graphite, hard carbon, soft carbon, amorphous carbon and acetylene black can be used. Among them, graphite alone, or a mixture of graphite and hard carbon is preferred for the following reason. Graphite is preferred as the carbonaceous material 101 of the negative electrode active material 100 because graphite improves conductivity of the active material. Hard carbon is preferred as the carbonaceous material 101 of the negative electrode active material 100 because hard carbon exhibits a significant effect of relaxing expansion and contraction by coating the whole active material. The above-mentioned combination includes both of the form in which the silicon oxide phase 102 and a crack 104 are included in the carbonaceous material 101 and the form in which these phases are held by the carbonaceous material 101.

The negative electrode active material 100 may be coated with the same type of compound as the carbonaceous material 101 described above. When the negative electrode active material 100 is coated, there is the advantage that the negative electrode active material 100 has excellent conductivity because the silicon oxide phase 102 is not exposed, but is coated with a carbon-based compound.

When the amount of the carbonaceous material 101 is large, so that the silicon oxide phase 102 and the silicon phase 103 are thickly coated, the Li ion conductance decreases, leading to deterioration of rate characteristics at a low temperature. Thus, the thickness d2 of the thinnest region of the carbonaceous material 101 on the surface of the negative electrode active material 100 is preferably no more than 1/30 of the diameter d1 of the negative electrode active material. The thickness d1 and the diameter d2 can be determined by observing 10 or more active material particles randomly selected from a SEM picture of the cross section of the negative electrode active material 100. It is preferred that all negative electrode active materials satisfy conditions for improvement of the Li ion conductance, but those that do not satisfy the conditions may be included. In this case, the ratio of negative electrode active material that do not satisfy the conditions for improvement of the Li ion conductance is preferably no more than 10%.

It is preferred to reduce the mass ratio of the carbonaceous material in the negative electrode active material 100 for improving the Li ion conductance. Specifically, it is preferred that where a mass of the carbonaceous material 101 is $W_C$, a mass of the silicon oxide phase 102 is $W_{SiO}$, and a mass of the silicon phase 103 is $W_{Si}$, $0.85<[W_{SiO}+W_{Si}]/[W_C+W_{SiO}+W_{Si}]\leq 0.95$ is satisfied. The mass ratio of the carbonaceous material 101, the silicon oxide phase 102 and the silicon phase 103 is determined in the following manner. First, using a SEM-EDX (Scanning Electron Microscope Energy Dispersive X-ray Spectrometer), the cross section of the negative electrode active material 100 is observed and components are analyzed for randomly selected 10 or more negative electrode active materials to examine which regions of the acquired picture correspond to the carbonaceous material 101, the silicon oxide phase 102 and the silicon phase 103. Next, areas of the carbonaceous material 101, the silicon oxide phase 102 and the silicon phase 103 are determined from the cross section picture, and an average mass is calculated from the area to determine the mass ratio.

The silicon oxide phase 102 of the embodiment exists in a granular form in the carbonaceous material 101. The silicon oxide phase 102 includes a compound having an amorphous structure, a low-crystalline structure, a crystalline structure or the like and represented by the chemical formula of $SiO_y$ ($1<y\leq 2$). The silicon oxide phase 102 is physically coupled to the silicon phase 103 to include or hold the silicon phase 103. When the silicon oxide phase 102 is aggregated, silicon oxide phases 102 are coupled together, so that the silicon oxide phase is coarsened. It is not preferred that the negative electrode active material 100 with the coarsened silicon oxide phase 102 is used for a secondary battery because the deterioration rate of cycle characteristics of the battery increases. Preferably, the silicon oxide phase 102 is dispersed in the carbonaceous material 101 for preventing aggregation of the silicon oxide phase 102.

When the size of the silicon oxide phase 102 is small and the variation in phase size is small, aggregation of the silicon phase 103 and coarsening of the phase are hard to occur. In a secondary battery in which the negative electrode active material 100 free from aggregation and coarsening of the silicon phase 103, the capacity deterioration rate associated with charge-discharge cycles decreases, so that life characteristics are improved. The preferred average maximum diameter of the silicon oxide phase 102 is in a range of 50 nm to 1000 nm. When the average maximum diameter falls above this range, an effect of suppressing aggregation of the silicon phase 103 cannot be obtained. When the average maximum diameter falls below this range, it is difficult to disperse the silicon oxide phase 102 in the carbonaceous material 101 in preparation of the active material, and there arises the problem of deterioration of rate characteristics due to a reduction in conductivity as an active material, and deterioration of initial charge-discharge capacity efficiency, etc. The average maximum diameter is further preferably 100 nm or more to 500 nm or less, and when average maximum diameter falls within this range, further satisfactory life characteristics can be obtained. The average maximum diameter of the phase is a value obtained by averaging the longest diameters among diameters of phases that are identified as the silicon oxide phase 102 by observing the cross section of the negative electrode active material 100 with a SEM-EDX. For calculating an average value, 10 or more samples are used.

For obtaining characteristics satisfactory as an overall active material, the variation in size of the silicon oxide phase 102 is preferably as small as possible. For a standard deviation represented by (d84%−d16%)/2 where d16% is a 16% cumulative diameter and d84% is a 84% cumulative diameter in terms of a volume with the phase considered as a particle, the value of (standard deviation/average size) is preferably no more than 1.0, and when the value is no more than 0.5, excellent life characteristics can be obtained. The average size (volume average) and the standard deviation defined as (d84%−d16%)/2 are determined in accordance with the following method. For the synthesized negative active material 100 after firing, a SEM picture of a cross section is photographed. The photographed picture image is analyzed with the phase considered as a particle by a SEM picture analysis software (Mac-View (registered trademark) manufactured by Mountech Co., Ltd.) to obtain particle size distribution data. From the obtained particle size distribution data, an average size (volume average) and a standard deviation defined as (d84%−d16%)/2 and a value of (standard deviation/average size) are calculated.

The silicon phase 103 of the embodiment includes crystalline silicon that inserts and desorbs lithium. Preferably, the silicon phase 103 exists in the silicon oxide phase 102, and is included in or held by the silicon oxide phase 102. It is preferred that the size of the silicon phase 103 is small because the amount of expansion and contraction associated with insertion and desorption of lithium decreases. It is not preferred that the size of the silicon phase 103 is large because particle size reduction of the negative active material 100 occurs when the silicon phase 103 expands. Thus, the average maximum diameter of the silicon phase 103 is preferably in a range of several nm or more to 100 nm or less. Since the silicon phase 103 is easily coarsened with phases coupled due to expansion, the silicon phase 103 is preferably dispersed in the silicon oxide phase 102. Expansion and contraction due to insertion and desorption of a large amount of lithium to the silicon phase 103 is distributed to the silicon oxide phase 102 and the carbonaceous material 101, and thereby relaxed to prevent particle size reduction of the active material particles. The average maximum diameter of the silicon phase 103 can be determined in the same manner as in the case of the average maximum diameter of the silicon oxide phase 102.

It is preferred that as a ratio of the silicon phase 103 to the carbonaceous material 101, the molar ratio of the Si element of the silicon phase 103 to the C element of the carbonaceous material 101 is in a range of 0.2≤Si/C≤2 because a high capacity and excellent large-current characteristics can be maintained. The molar ratio of the Si element of the silicon phase 103 to $SiO_y$ of the silicon oxide phase 102 is desired to be 0.6≤Si/$SiO_y$≤1.5 because a high capacity and satisfactory cycle characteristics can be obtained as the negative electrode active material 100.

The negative electrode active material 100B in FIG. 2 contains cracks 104. An electrolyte solution of a nonaqueous electrolyte easily penetrates into the crack 104. It is preferred that an electrolyte solution penetrates into the crack 104 because the Li conductance is improved, and large-current characteristics and the capacity retention ratio are improved. The crack 104 is generated due to expansion of the silicon oxide phase 102 and the silicon phase 103 associated with insertion and desorption of lithium by the silicon phase 103. Cracks 104 include those that are directed toward the center of the negative electrode active material 100B from the surface of the carbonaceous material 101, and those that are not directional. Cracks 104 include those having a depth or length d3 equal to or greater than ⅓ of the diameter of the negative electrode active material 100B. The depth or length of the crack 104 refers to the longest side of the longest crack among cracks in the particle of the negative electrode active material. Presence/absence of the crack 104 and d3 can be examined by taking the negative electrode active material 100B from the negative electrode and observing a SEM picture of the cross section of the negative electrode active material 100B.

In the negative electrode active material 100A, stress from a change in volume of the silicon phase due to insertion and desorption of lithium is relaxed by combining the silicon oxide phase and the carbonaceous material. However, when the silicon phase is coarsened by repetition of the charge-discharge cycle, the composite may be cracked to promote particle size reduction. For suppressing the particle size reduction, the crack 104 can be formed in the composite beforehand. Preferably, the crack has a shape which is suitable for expansion and contraction and helps improve Li conductivity. That is, the crack is desired to be permeable to an electrolyte solution, have a linear shape or tunnel shape, and be finely dispersed with a moderate size throughout the composite. Therefore, it is preferred that the crack has such a shape that the diameter is 50 nm or more to 5 μm or less, and the length is equal to or greater than ⅕ of the particle size of the negative electrode active material. In addition, it is further preferred that one end of the crack is opened to the surface of the negative electrode active material.

Preferably, the carbonaceous material 101 contains zirconia or stabilized zirconia for retaining the structure of particles and preventing aggregation of the silicon oxide phase 102. Prevention of aggregation of the silicon oxide phase 102 has the advantage that cycle characteristics are improved.

Preferably, the carbonaceous material 101 contains carbon fibers for retaining the structure of particles and preventing aggregation of the silicon oxide phase 102, and securing conductivity. It is effective that the diameter of carbon fibers added is comparable to the size of the silicon oxide phase 102, and the average diameter is preferably 50 nm or more to 1000 nm or less, especially preferably 100 nm or more to 500 nm or less. The content of carbon fibers is preferably 0.1% by mass or more to 8% by mass or less, especially preferably 0.5% by mass or more to 5% by mass or less based on the mass of the negative electrode active material 100. The average diameter of carbon fibers is an average diameter of 10 carbon fibers randomly selected from a SEM picture.

The carbonaceous material 101 may contain an alkoxide and a Li compound. When these substances are contained, coupling of $SiO_2$ contained in the silicon oxide phase 102 and the carbonaceous material 101 is strengthened, and $Li_4SiO_4$ that is excellent in Li ion conductivity is generated in the silicon oxide phase 102. Examples of alkoxide include silicon ethoxide. Examples of the Li compound include lithium carbonate, lithium oxide, lithium hydroxide, lithium oxalate and lithium chloride.

Lithium silicate such as $Li_4SiO_4$ may be dispersed on the surface of or inside the silicon oxide phase 102. It is considered that when a heat treatment is performed, the lithium salt added to the carbonaceous material 101 undergoes a solid reaction with the silicon oxide phase 102 in the carbonaceous material 101 to form lithium silicate.

The half-width of the diffraction peak of the Si (220) plane in powder X-ray diffraction measurement of the active material is 1.5° or more to 8.0° or less. The half-width of the diffraction peak of the Si (220) plane increases as the crystal grain of the Si phase is grown, and when the crystal grain of the Si phase is significantly grown, cracking or the like easily occurs in active material particles due to expansion and contraction associated with insertion and desorption of lithium, but occurrence of such a problem can be avoided as long as the half width falls within a range of 1.5° or more to 8.0° or less.

(Manufacturing Method)

Figure 3:
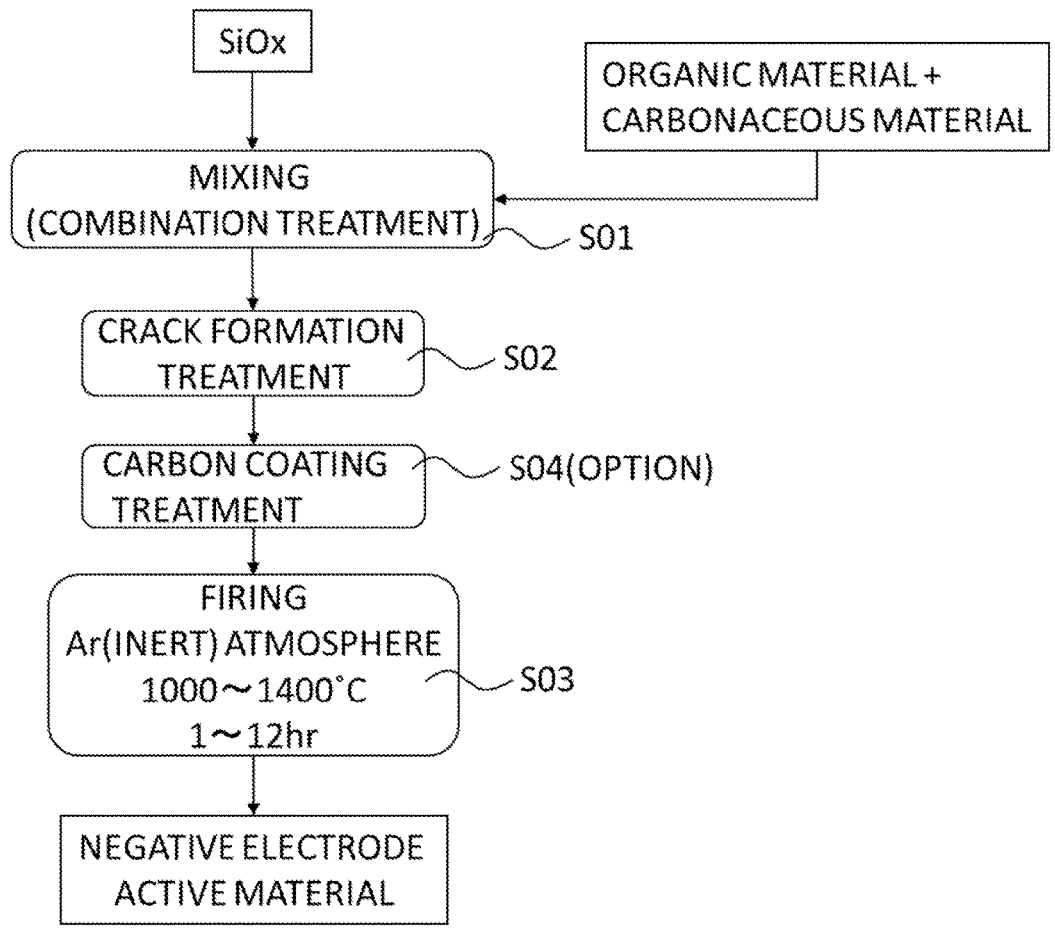
FIG. 3 is a chart showing a method for producing a negative electrode active material in an embodiment.

A method for manufacturing the negative electrode active material 100 for a nonaqueous secondary battery according to the first embodiment will now be described. The procedure of this method is shown in FIG. 3.

In the embodiment, $SiO_x$ ($0.8 \leq x \leq 1.5$) as silicon oxide, a resin as an organic compound, at least one carbon material selected from the group consisting of graphite, coke, low-temperature fired carbon and pitch, and a heat-decomposable polymer are mixed, and the mixture is fired at 1000° C. or more to 1400° C. or less to obtain a negative electrode active material.

The negative electrode active material 100 according to the first embodiment can be synthesized by mixing raw materials by a dynamic treatment, a stirring treatment or the like in a solid phase or a liquid phase, and firing the mixture.

(Combination Treatment: S01)

In the combination treatment, a silicon oxide raw material, an organic material and a carbon material are mixed to form a composite.

The silicon oxide raw material, the organic material and the carbon material can be combined by mixing/stirring in a liquid phase. The mixing/stirring treatment can be performed by, for example, various kinds of stirrers, ball mill and bead mill devices, and a combination thereof. Combination of the silicon oxide material, the organic material and the carbon material is preferably performed by liquid phase mixing in a liquid using a dispersion medium. In dry mixing, it is difficult to uniformly disperse the silicon oxide material and the carbon material without being aggregated.

As the dispersion medium, an organic solvent, water or the like can be used, but it is preferred to use a liquid having good affinity with both silicon monoxide and the carbon precursor and carbon material. Specific examples may include ethanol, acetone, isopropyl alcohol, methyl ethyl ketone and ethyl acetate.

It is preferred to use $SiO_x$ ($0.8 \leq x \leq 1.5$) as the silicon oxide raw material as a precursor of the silicon phase 103 and the silicon oxide phase 102. Particularly, use of SiO ($x \approx 1$) is desirable in that the quantitative relationship between the silicon phase 103 and the silicon oxide phase 102 is set to a preferred ratio. $SiO_x$ may be crushed at the time of mixing, or a fine powder of $SiO_x$ may be used. The average primary particle size of micronized $SiO_x$ is preferably 50 nm or more to 1000 nm or less. Further preferably, $SiO_x$ having an average primary particle size of 100 nm or more to less than 500 nm and having a small variation in particle size is used. The average primary particle size of $SiO_x$ is a volume average diameter calculated from a particle size distribution obtained by laser diffraction.

As the organic material, an organic compound such as a monomer or an oligomer which is liquid and capable of being easily polymerized is used. Examples include furan resins, xylene resins, ketone resins, amino resins, melamine resins, urea resins, aniline resins, urethane resins, polyimide resins, polyester resins, phenol resins and monomers thereof. Specific monomers include furan compounds such as furfuryl alcohol, furfural and furfural derivatives, and the monomer is polymerized in a mixture of combined materials. For polymerizing the monomer, for example, hydrochloric acid or an acid anhydride should be added.

As the carbon material, at least one selected from graphite, coke, low-temperature fired carbon and pitch can be used. Particularly, one that is melted by heating, such as pitch, is melted during a dynamic milling treatment and is not satisfactorily combined, and therefore should be mixed with one that is not melted, such as coke or graphite.

(Crack Formation Treatment: S02)

Cracks for suppressing cracking rupture in the negative electrode active material 100 can be formed in accordance with the following method. A fiber-shaped heat-decomposable polymer is added in a precursor of a negative electrode active material composite before firing, and a firing treatment is performed to vaporize the fiber-shaped heat-decomposable polymer, so that tunnel-shaped cracks are formed in the negative electrode active material. Examples of the heat-decomposable polymer may include polystyrene (PS), polypropylene (PP), polyethylene (PE), polyacetal (PAC) and polytetrafluoroethylene (TF). When amorphous carbon or hard carbon is generated from the resin in the negative electrode active material precursor, the carbonization temperature of the resin in the precursor is preferably lower than the heat decomposition temperature of the heat-decomposable polymer. This is because cracks formed by vaporization of the heat-decomposable polymer may be closed due to contraction associated with carbonization of the surrounding resin. Preferably, the heat-decomposable polymer added has a diameter of 50 nm or more to 5 μm or less and a length of 10 μm or more to 100 μm or less for forming cracks effective for improvement of characteristics of the negative electrode active material.

(Firing Treatment: S03)

Firing is performed under an inert atmosphere such as in Ar. In firing, the organic material is carbonized, and $SiO_x$ is separated into two phases: the silicon phase 103 (silicon) and the silicon oxide phase 102 ($SiO_y$) through a disproportionation reaction.

The disproportionation reaction proceeds at a temperature higher than 800° C., and $SiO_x$ is separated into the very small silicon phase 103 and the silicon oxide phase 102. As the reaction temperature is elevated, the crystal of the silicon phase 103 increases in size, so that the half-width of the peak of silicon (220) decreases. The firing temperature which ensures that a half-width in a preferred range is obtained is in a range of 1000° C. or more to 1600° C. or less. Si of the silicon phase 103 generated through the disproportionation reaction changes into silicon carbide by reacting with carbon at a temperature higher than 1400° C. Silicon carbide is utterly inactive to insertion of lithium, and therefore when silicon carbide is generated, the charge-discharge capacity of the active material is reduced. The firing time is preferably between 1 hour and about 12 hours.

(Carbon Coating Treatment: S04)

Particles as a composite obtained by the combination treatment may be coated with carbon before the firing treatment after the combination treatment. As a material to be used for coating, one that is formed into the carbonaceous material 101 when heated under an inert atmosphere, such as pitch, a resin or a polymer can be used. Specifically, one that is sufficiently carbonized by firing at about 1200° C., such as petroleum pitch, mesophase pitch, a furan resin, cellulose or a rubber is preferred. This is because firing cannot be performed using a temperature higher than 1400° C. as described in the section of "Firing Treatment".

As a coating method, a monomer with composite particles dispersed therein is polymerized and solidified, and the resulting polymer is subjected to firing. Alternatively, a polymer is dissolved in a solvent, composite particles are dispersed in the solution, the solvent is then evaporated, and the obtained solid is subjected to firing. As another method to be used for carbon coating, carbon coating can be performed by CVD. This method is a method in which over a sample heated to 800° C. or more to 1000° C. or less, a gaseous carbon source is made to pass with an inert gas as a carrier gas to perform carbonization on the surface of the sample. In this case, benzene, toluene, styrene or the like can be used as the carbon source.

In the carbon coating treatment and combination treatment, an alkoxide, a Li compound and carbon fibers may be added at the same time.

The negative electrode active material 100 according to this embodiment is obtained through the synthesis method described above. A product after carbonization and firing may be adjusted for the particle size, the specific surface area and so on using various kinds of mills, crushing apparatuses, grinders and the like.

Second Embodiment

A nonaqueous electrolyte secondary battery according to the second embodiment will be described.

The nonaqueous secondary battery according to the second embodiment includes an exterior member; a positive electrode stored in the exterior member; a negative electrode containing an active material, the negative electrode stored in the exterior member so as to be spatially separated from the positive electrode, for example with a separator interposed between the positive electrode and the negative electrode; and a nonaqueous electrolyte filling the inside of the exterior member.

Figure 4:
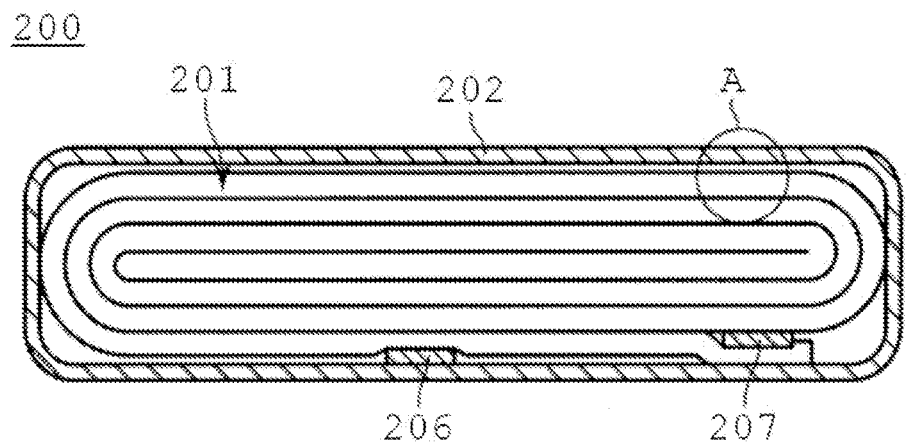
FIG. 4 is a conceptual view of a nonaqueous electrolyte secondary battery of an embodiment.
Figure 5:
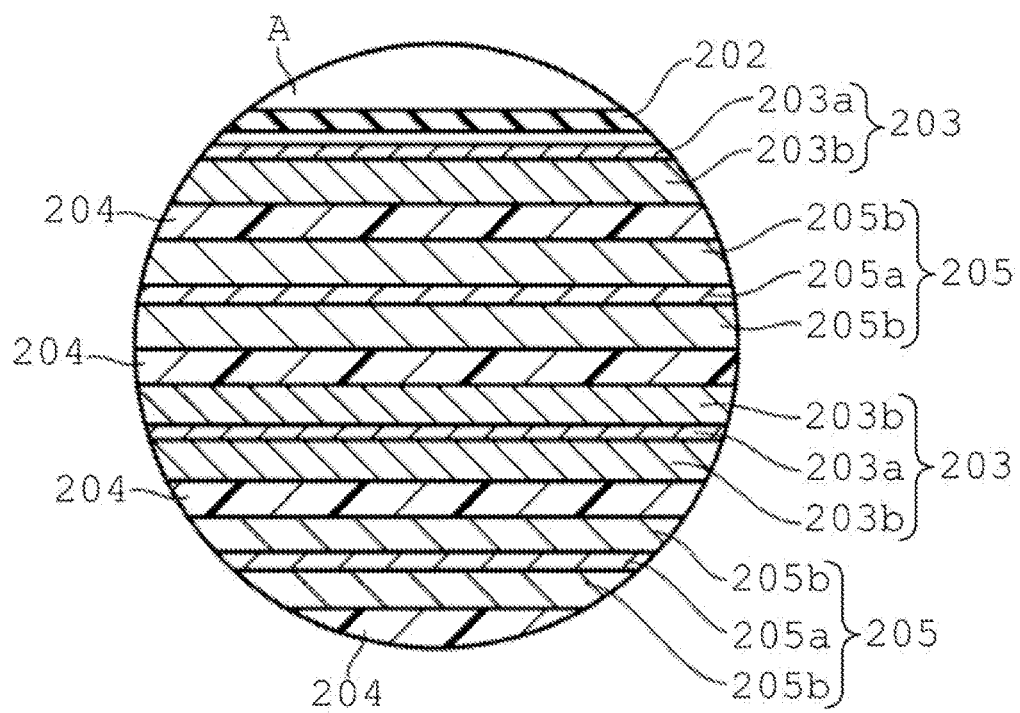
FIG. 5 is an enlarged conceptual view of a nonaqueous electrolyte secondary battery of an embodiment.

The nonaqueous electrolyte secondary battery will be described more in detail with reference to conceptual views of FIGS. 4 and 5 showing one example of a nonaqueous electrolyte secondary battery 200 according to the embodiment. FIG. 4 is a conceptual sectional view of the flat type nonaqueous electrolyte secondary battery 200 including a bag-shaped exterior member 202 composed of a laminated film, and FIG. 5 is an enlarged sectional view of part A in FIG. 4. Each view is a conceptual view for explanation, and the shape and dimension and the ratio therein may be different from those of the actual apparatus, but they can be appropriately design-changed by referring to the following descriptions and publicly known techniques.

A flat winding electrode group 201 is stored in the bag-shaped exterior member 202 composed of a laminated film with an aluminum foil interposed between two resin layers. The flat winding electrode group 201 is formed by spirally winding a laminate with a negative electrode 203, a separator 204, a positive electrode 205 and a separator 204 laminated in this order from the outside, and press-molding the wound laminate. The negative electrode 203 on the outermost side has a configuration in which a negative electrode mixture 203b is formed on one surface of a negative electrode current collector 203a on the inner surface side as shown in FIG. 5. The other negative electrode 203 is configured such that the negative electrode mixture 203b is formed on each of both surfaces of the negative electrode current collector 203a. The active material in the negative electrode mixture 203b contains the active material for a battery according to the first embodiment. The positive electrode 205 is configured such that a positive electrode mixture 205b is formed on each of both surfaces of a positive electrode current collector 205a.

In the vicinity of the outer circumferential end of the winding electrode group 201, a negative electrode terminal 206 is electrically connected to the negative electrode current collector 203a of the negative electrode 203 on the outermost side, and a positive electrode terminal 207 is electrically connected to the positive electrode current collector 205a of the positive electrode 205 on the inner side. The negative electrode terminal 206 and the positive electrode terminal 207 are extended to the outside from the opening of the bag-shaped exterior member 202. For example, a liquid nonaqueous electrolyte is injected from the opening of the bag-shaped exterior member 202. The opening of the bag-shaped exterior member 202 is heat-sealed with the negative electrode terminal 206 and the positive electrode terminal 207 held therein to hermetically seal the winding electrode group 201 and the liquid nonaqueous electrolyte.

The negative electrode terminal 206 is made of, for example, aluminum or an aluminum alloy containing an element such as Mg, Ti, Zn, Mn, Fe, Cu or Si. Preferably, the material of the negative electrode terminal 206 is similar to that of the negative electrode current collector 203a for reducing the contact resistance with the negative electrode current collector 203a.

For the positive electrode terminal 207, a material having electrical stability when the potential to the lithium ion metal is in a range of 3 V or more to 4.25 V or less, and conductivity can be used. A specific example is aluminum or an aluminum alloy containing an element such as Mg, Ti, Zn, Mn, Fe, Cu or Si. Preferably, the material of the positive electrode terminal 207 is similar to that of the positive electrode current collector 205a for reducing the contact resistance with the positive electrode current collector 205a.

Hereinafter, the bag-shaped exterior member 202, the positive electrode 205, the negative electrode 203, the electrolyte and the separator 204, each of which is a constituent member of the nonaqueous electrolyte secondary battery 200, will be described in detail.

1) Bag-Shaped Exterior Member 202

The bag-shaped exterior member 202 is formed from a laminated film having a thickness of 0.5 mm or less. Alternatively, a metallic container having a thickness of 1.0 mm or less is used as the exterior member. More preferably, the metallic container has a thickness of 0.5 mm or less.

The shape of the bag-shaped exterior member 202 can be selected from a flat type (thin type), a rectangular type, a cylindrical type, a coin type and a button type. Examples of the exterior member include exterior members for small batteries that are mounted on portable electronic devices etc. and exterior members for large batteries that are mounted on two to four-wheeled cars etc., depending on a battery size.

As the laminated film, a multilayer film with a metal layer interposed between resin layers is used. The metal layer is preferably an aluminum foil or an aluminum alloy foil for weight reduction. For the resin layer, for example, a polymer material such as polypropylene (PP), polyethylene (PE), nylon or polyethylene terephthalate (PET) can be used. The laminated film can be sealed by heat seal to be formed into a shape of the exterior member.

The metallic container is made from aluminum or an aluminum alloy. The aluminum alloy is preferably an alloy containing an element such as magnesium, zinc or silicon. When the alloy contains a transition metal such as iron, copper, nickel or chromium, the amount the transition metal is preferably no more than 100 ppm by mass.

2) Positive Electrode 205

The positive electrode 205 has a structure in which the positive electrode mixture 205b containing an active material is carried on one surface or both surfaces of the positive electrode current collector 205a.

The thickness at one surface of the positive electrode mixture 205b is desired to be in a range of 1.0 μm or more to 150 μm or less from the viewpoint of the large-current discharge characteristics and cycle life retention of the battery. Therefore, when the positive electrode mixture 205b is carried on both surfaces of the positive electrode current collector 205a, the total thickness of the positive electrode mixture 205b is desired to be in a range of 20 μm or more to 300 μm or less. The thickness at one surface is more preferably in a range of 30 μm or more to 120 μm or less. When the thickness at one surface is in this range, large-current discharge characteristics and the cycle life are improved.

The positive electrode mixture 205b may contain a conducting agent in addition to the positive electrode active material.

The positive electrode mixture 205b may contain a binding agent for binding positive electrode materials.

Use of various oxides, for example manganese dioxide, lithium manganese composite oxides, lithium-containing nickel cobalt oxides (e.g., $LiCOO_2$), lithium-containing nickel cobalt oxides (e.g., $LiNi_{0.8}CO_{0.2}O_2$) and lithium manganese composite oxides (e.g., $LiMn_2O_4$ and $LiMnO_2$) is preferred because a high voltage is obtained.

Examples of the conducting agent may include acetylene black, carbon black and graphite.

Specific examples of the binding agent that can be used include polytetrafluoroethylene (PTFE), polyvinylidene fluoride (PVdF), ethylene-propylene-diene copolymers (EPDM) and styrene-butadiene rubber (SBR).

It is preferred that the blending ratio of the positive electrode active material, the conducting agent and the binding agent is 80% by mass or more to 95% by mass or less for the positive electrode active material, 3% by mass or more to 20% by mass or less for the conductive agent, and 2% by mass or more to 7% by mass or less for the binding agent because good large-current discharge characteristics and a good cycle life are obtained.

As the current collector 205a, a conductive board having a porous structure or a nonporous conductive board can be used. The thickness of the current collector is desired to be 5 μm or more to 20 μm or less. When the thickness of the current collector is in this range, electrode strength and weight reduction can be balanced.

The positive electrode 205 is prepared by, for example, suspending an active material, a conducting agent and a binding agent in a general-purpose solvent to prepare a slurry, applying the slurry to the current collector 205a, drying the slurry, and then performing pressing. Alternatively, the positive electrode 205 may be prepared by forming an active material, a conducting agent and a binding agent into a pellet shape to obtain the positive electrode mixture 205b, and forming the positive electrode mixture 205b on the current collector 205a.

3) Negative Electrode 203

The negative electrode 203 has a structure in which the negative electrode mixture 203b containing a negative electrode active material and other negative electrode materials is carried on one surface or both surfaces of the negative electrode current collector 203a. As the negative electrode active material, the negative electrode active material 100 according to the first embodiment is used.

The thickness of the negative electrode mixture 203b is desired to be in a range of 10 μm or more to 150 μm or less. Therefore, when the negative electrode mixture 203b is carried on both surfaces of the negative electrode current collector 203a, the total thickness of the negative electrode mixture 203b is in a range of 20 μm or more to 300 μm or less. The thickness at one surface is more preferably in a range of 30 μm or more to 100 μm or less. When the thickness at one surface is in this range, large-current discharge characteristics and the cycle life are considerably improved.

The negative electrode mixture 203b may contain a binding agent for binding negative electrode materials. As the binding agent, for example, polytetrafluoroethylene (PTFE), polyvinylidene fluoride (PVdF), ethylene-propylene-diene copolymers (EPDM), styrene-butadiene rubber (SBR), polyimide, polyaramid, polyacrylonitrile, polyacrylic acid and the like can be used. Two or more binding agents may be used in combination, and when a binding agent excellent in binding of active materials and a binding agent excellent in binding of an active material and a current collector is used in combination, or a binding agent having high hardness and a binding agent excellent in flexibility is used in combination, a negative electrode excellent in life characteristics can be prepared.

The negative electrode mixture 203b may contain a conducting agent. Examples of the conducting agent may include acetylene black, carbon black and graphite.

As the current collector 203a, a conductive board having a porous structure or a nonporous conductive board can be used. The conductive board can be formed from, for example, copper, stainless steel or nickel. The thickness of the current collector 203a is desired to be 5 μm or more to 20 μm or less. When the thickness of the current collector is in this range, electrode strength and weight reduction can be balanced.

The negative electrode 203 is prepared by, for example, suspending an active material, a conducting agent and a binding agent in a general-purpose solvent to prepare a slurry, applying the slurry to the current collector 203a, drying the slurry, and then performing pressing. Alternatively, the negative electrode 203 may be prepared by forming an active material, a conducting agent and a binding agent into a pellet shape to obtain the negative electrode mixture 203b, and forming the negative electrode mixture 203b on the current collector 203a.

It is preferred that the blending ratio of the negative electrode active material, the conducting agent and the binding agent is 80% by mass or more to 95% by mass or less for the negative electrode active material, 3% by mass or more to 20% by mass or less for the conductive agent, and 2% by mass or more to 7% by mass or less for the binding agent because good large-current discharge characteristics and a good cycle life are obtained.

4) Electrolyte

As the electrolyte, a nonaqueous electrolyte solution, an electrolyte impregnation type polymer electrolyte, a polymer electrolyte or an inorganic solid electrolyte can be used.

The nonaqueous electrolyte solution is a liquid electrolyte solution prepared by dissolving an electrolyte in a nonaqueous solvent, and is held in gaps in the electrode group.

As the nonaqueous solvent, it is preferred to use a nonaqueous solvent that principally includes a mixed solvent of propylene carbonate (PC) or ethylene carbonate (EC) and a nonaqueous solvent having a viscosity lower than that of PC or EC (hereinafter, referred to a "second solvent").

As the second solvent, for example, linear carbon is preferred, and examples thereof include dimethyl carbonate (DMC), methylethyl carbonate (MEC), diethyl carbonate (DEC), ethyl propionate, methyl propionate, γ-butyrolactone (BL), acetonitrile (AN), ethyl acetate (EA), toluene, xylene and methyl acetate (MA). These second solvents can be used alone or in the form of a mixture of two or more thereof. Particularly, it is more preferred that the second solvent has a donor number of 16.5 or less.

The viscosity of the second solvent is preferably 2.8 cmp or less at 25° C. The blending amount of ethylene carbonate or propylene carbonate in the mixed solvent is preferably 1.0% or more to 80% or less in terms of a volume ratio. The blending amount of ethylene carbonate or propylene carbonate is more preferably 20% or more to 75% or less in terms of a volume ratio.

Examples of the electrolyte contained in the nonaqueous electrolyte solution include lithium salts (electrolytes) such as lithium perchlorate ($LiClO_4$), lithium hexafluorophosphate ($LiPF_6$), lithium boron fluoride ($LiBF_4$), lithium arsenic hexafluoride ($LiAsF_6$), lithium trifluorometasulfonate ($LiCF_3SO_3$), bis-trifluoromethylsulfonylimide lithium [$LiN(CF_3SO_2)_2$]. Among them, $LiPF_6$ and $LiBF_4$ are preferably used.

The amount of the electrolyte dissolved in the nonaqueous solvent is desired to be 0.5 mol/L or more to 2.0 mol/L or less.

5) Separator 204

When a nonaqueous electrolyte solution is used and when an electrolyte impregnation type polymer electrolyte is used, the separator 204 can be used. As the separator 204, a porous separator is used. As a material of the separator 204, for example, a porous film including polyethylene, polypropylene or polyvinylidene fluoride (PVdF), or a nonwoven fabric made of a synthetic resin can be used. Particularly, a porous film including polyethylene, or polypropylene or both is preferred because safety of the secondary battery can be improved.

The thickness of the separator 204 is preferably 30 µm or less. When the thickness exceeds 30 µm, the distance between positive and negative electrodes may increase, leading to an increase in internal resistance. The lower limit of the thickness is preferably 5 µm. When the thickness is less than 5 µm, strength of the separator 204 may be significantly reduced to the extent that an internal short-circuit easily occurs. The upper limit of the thickness is more preferably 25 µm, and the lower limit of the thickness is more preferably 1.0 µm.

Preferably, the separator 204 has a thermal shrinkage rate of 20% or less when left standing at 120° C. for 1 hour. When the thermal shrinkage rate exceeds 20%, the possibility increases that heating causes a short-circuit. The thermal shrinkage rate is preferably 15% or less.

Preferably, the separator 204 has a porosity falling within a range of 30% or more to 70% or less. The reason for this is as follows. When the porosity is less than 30%, it may be difficult to obtain high electrolyte retainability in the separator 204. On the other hand, when the porosity exceeds 60%, sufficient strength of the separator 204 may not be obtained. The porosity is more preferably in a range of 35% or more to 70% or less.

Preferably, the separator 204 has an air permeability of 500 seconds/100 $cm^3$ or less. When the air permeability exceeds 500 seconds/100 $cm^3$, it may be difficult to obtain high ion mobility in the separator 204. The lower limit of the air permeability is 30 seconds/100 $cm^3$. When the air permeability is less than 30 seconds/100 $cm^3$, sufficient separator strength may not be obtained.

The lower limit of the air permeability is more preferably 300 seconds/100 $cm^3$, and the lower limit of the air permeability is more preferably 50 seconds/100 $cm^3$.

Third Embodiment

A battery pack according to the third embodiment will now be described.

The battery pack according to the third embodiment has one or more nonaqueous electrolyte secondary battery (i.e., single battery) according to the second embodiment. When the battery pack includes a plurality of single batteries, the single batteries are disposed so as to be electrically connected in series, in parallel or in series and in parallel.

A battery pack 300 will be described in detail with reference to FIGS. 6 and 7. In the battery pack 300 shown in FIG. 6, the flat type nonaqueous electrolyte secondary battery 200 shown in FIG. 4 is used as a single battery 301.

A plurality of single batteries 301 are stacked such that negative electrode terminals 302 and positive electrode terminals 303 extending to outside are aligned in the same direction, and the single batteries 301 are fastened together with an adhesive tape 304 to form an assembled battery 305. These single batteries 301 are mutually electrically connected in series as shown in FIG. 7.

A print wiring board 306 is disposed so as to face a side surface of the single battery 301 from which the negative electrode terminal 302 and the positive electrode terminal 303 extend. A thermistor 307, a protective circuit 308 and a terminal 309 for supply of electricity to external equipment are mounted on the print wiring board 306 as shown in FIG. 7. A surface of the print wiring board 306 which faces the assembled battery 305 is provided with an insulating plate (not illustrated) for avoiding unnecessary connection with wiring of the assembled battery 305.

A positive electrode side lead 310 is connected to the positive electrode terminal 303 situated at the lowermost layer of the assembled battery 305, and is electrically connected to the print wiring board 306 with its leading end inserted into a positive electrode side connector 311 of the print wiring board 306. A negative electrode side lead 312 is connected to the negative electrode terminal 302 situated at the uppermost layer of the assembled battery 305, and is electrically connected to the print wiring board 306 with its leading end inserted into a negative electrode side connector 313 of the print wiring board 306. These connectors 311 and 313 are connected to the protective circuit 308 through wirings 314 and 315 formed on the print wiring board 306.

The thermistor 307 is used for detecting a temperature of the single battery 301, and a detection signal thereof is sent to the protective circuit 308. The protective circuit 308 can disconnect positive side wiring 316a and negative side wiring 316b between the protective circuit 308 and the terminal 309 for supply of electricity to external equipment at a predetermined condition.

The predetermined condition means that for example the detection temperature of the thermistor 307 reaches a temperature equal to or higher than a predetermined temperature. The predetermined condition means that excessive charge, excessive discharge, excessive current or the like of the single battery 301 is detected. The detection of excessive charge or the like is performed for individual single batteries 301 or all single batteries 301 as a whole. When detection is performed for individual single batteries 301, a battery voltage may be detected, or a positive electrode potential or a negative electrode potential may be detected. In the latter case, a lithium electrode used as a reference electrode is inserted in the individual battery 301. In the case of FIGS. 6 and 7, wiring 317 for detection of voltage is connected to each of single batteries 301, and detection signals are sent to the protective circuit 308 through these wirings 317.

A protective sheet 318 made of rubber or resin is disposed on each of three side surfaces of the assembled battery 305 other than a side surface from which the positive electrode terminal 303 and the negative electrode terminal 302 are protruded.

The assembled battery 305 is stored in a storage container 319 together with the protective sheets 318 and the print wiring board 306. That is, the protective sheet 318 is disposed on each of both inner side surfaces in the long side direction and an inner side surface of the short side direction of the storage container 319, and the print wiring board 306 is disposed on the opposite inner side surface in the short side direction. The assembled battery 305 is situated in a space surrounded by the protective sheets 318 and the print wiring board 306. A lid 320 is attached on the upper surface of the storage container 319.

For fixation of the assembled battery 305, a heat-shrinkable tape may be used in place of the adhesive tape 304. In this case, a protective sheet is disposed on each of both side surfaces of the assembled battery, a heat-shrinkable tape is wound around the assembled battery, and the heat-shrinkable tape is then heat-shrunk to unify the assembled battery.

Figure 6:
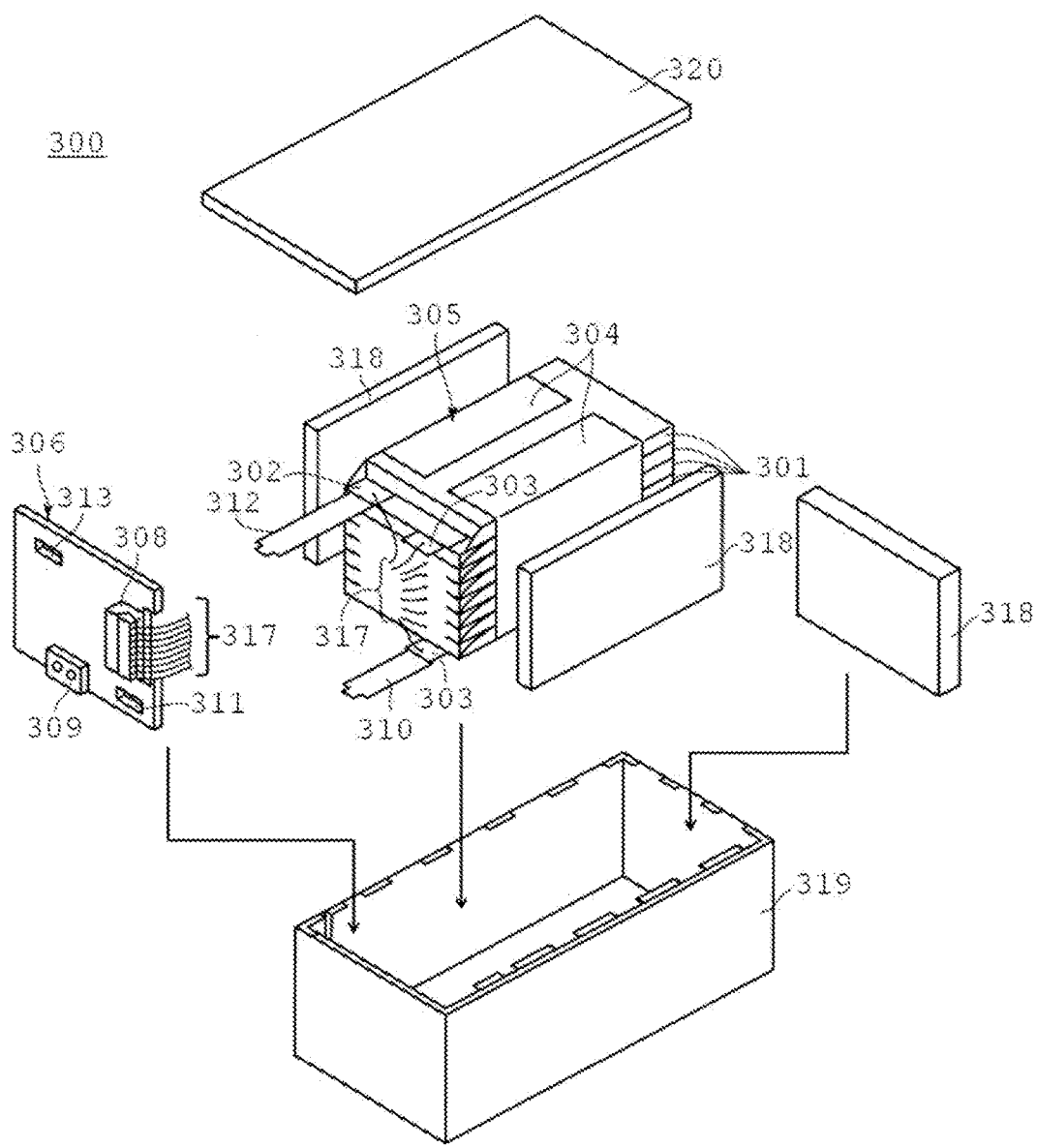
FIG. 6 is a conceptual view of a battery pack of an embodiment.
Figure 7:
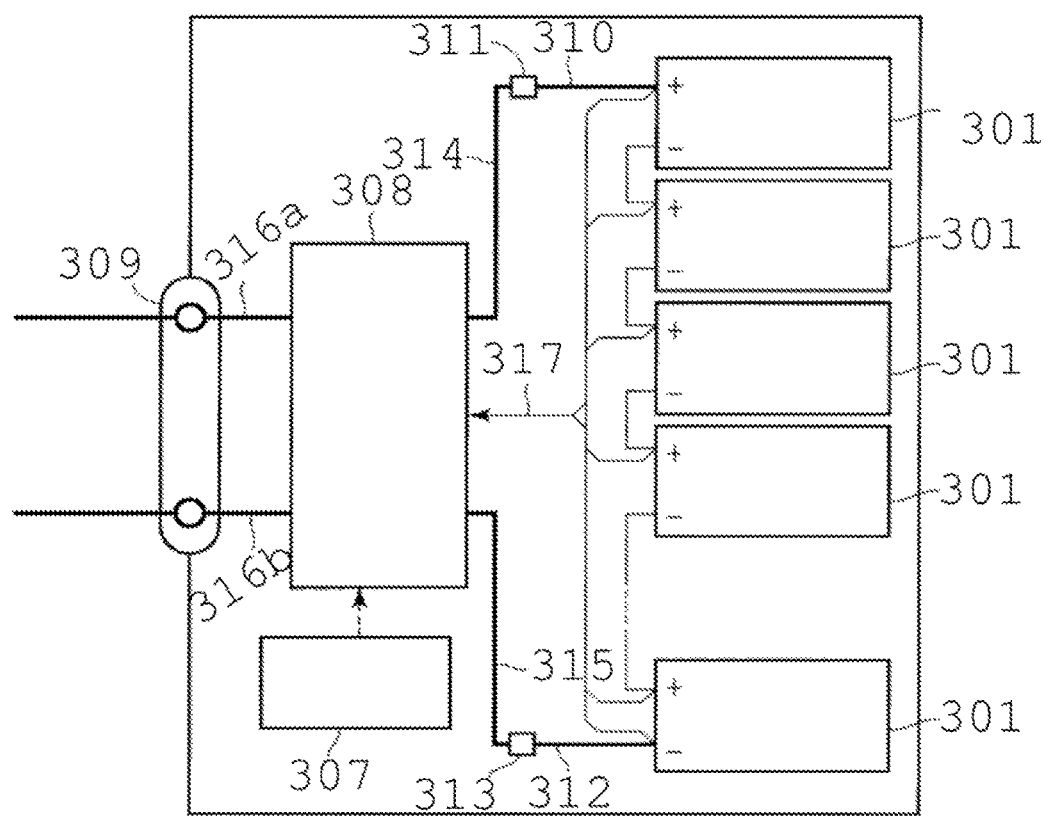
FIG. 7 is a block diagram showing an electric circuit of a battery pack of an embodiment.

FIGS. 6 and 7 show a configuration in which single batteries 301 are connected in series, but for increasing the battery capacity, single batteries may be connected in parallel, or series connection and parallel connection may be combined. Assembled battery packs can further connected in series or in parallel.

According to the embodiment described above, there can be provided a battery pack which has excellent charge-discharge cycle performance by including the nonaqueous electrolyte secondary battery having excellent charge-discharge cycle performance in the third embodiment.

The aspect of the battery pack is appropriately changed according to an application. Applications of the battery pack are preferably those in which excellent cycle characteristics are exhibited when a large current is extracted. Specific examples include applications in power sources for digital cameras, and on-board applications in two to four-wheeled hybrid electric cars, two to four-wheeled electric cars, assisted bicycles and the like. Particularly, a battery pack using a nonaqueous electrolyte secondary battery excellent in high-temperature characteristics is suitable for on-board applications.

Hereinafter, specific examples (examples of specifically preparing the battery described with FIG. 4 under respective conditions described in examples) will be shown, and effects thereof will be described.

Example 1

SiO was crushed under the following conditions, the crushed product, a carbon material and a heat-decomposable polymer were kneaded, and the kneaded product was fired in an Ar gas to obtain a negative electrode active material of Example 1.

SiO having an average primary particle size of 22.6 μm was crushed and mixed. A crush treatment was performed for 6 hours with ethanol as a dispersion medium using beads having a bead diameter of 0.5 mm in a continuous bead mill. The average primary particle size of the crush-treated product was 0.5 μm. Next, 5.0 g of the crush-treated product, 0.1 g of a graphite powder having an average primary particle size of 3 μm, 0.04 g of carbon fibers having an average diameter of 180 nm and 0.12 g of polypropylene fibers having a fiber diameter of 0.1 mm were added to a mixed liquid of 1.0 g of furfuryl alcohol, 10 g of ethanol and 0.125 g of water, and the mixture was subjected to a kneading treatment in a kneader to form a slurry. 0.2 g of dilute hydrochloric acid as a polymerization catalyst for furfuryl alcohol was added to the slurry after kneading, and the mixture was left standing at room temperature for 18 hours, and thereby dried and solidified to obtain a carbon composite.

The obtained carbon composite was fired in an Ar gas at 1100° C. for 3 hours, cooled to room temperature, then crushed, and screened through a sieve of 30 μm size to obtain a negative electrode active material under the sieve.

For the active material obtained in Example 1, the charge-discharge test, SEM image analysis and porosity measurement described below have been conducted, and charge-discharge characteristics and physical properties were evaluated.

77 parts by mass of the obtained sample, 25 parts by mass of graphite having an average diameter of 3 μm and 10 parts by mass of polyimide were put in a dispersion medium, and the mixture was kneaded, applied onto a copper foil having a thickness of 12 μm, and rolled. As the dispersion medium, N-methylpyrrolidone was used. After rolling, the copper foil was heat treated in an Ar gas at 250° C. for 2 hours, cut to a predetermined size, and then dried in vacuum at 100° C. for 12 hours to obtain a test electrode. A battery having metal Li as a counter electrode and a reference electrode and an EC/DEC (volume ratio of EC:DEC=1:2) solution of $LiPF_6$ (1 M) as an electrolyte solution was prepared in an argon gas atmosphere.

(Charge-Discharge Test)

A charge-discharge test was conducted for this battery. The charge-discharge test was conducted under the following condition: the battery was charged at a current density of 1 mA/cm$^2$ to a potential difference of 0.01 V between the reference electrode and the test electrode, further charged at a constant voltage of 0.01 V for 16 hours, and discharged at a current density of 1 mA/cm$^2$ to 1.5 V. After the cycle under this condition was performed three times, the charge-discharge cycle was performed under the same condition with the current value set to 2.5 mA/cm$^2$, and a ratio of a discharge capacity at 2.5 mA/cm$^2$ to discharge capacity at 1 mA/cm$^2$ was calculated. A cycle including charging the battery at a current density of 1 mA/cm$^2$ to a potential difference of 0.01 V between the reference electrode and the test electrode, and then discharging the battery at a current density of 1 mA/cm$^2$ to 1.5 V was performed 100 times, and a retention ratio of a discharge capacity at the 100th cycle to a discharge capacity at the first cycle was measured.

(SEM Picture Analysis)

The obtained negative electrode active material composite powder was dispersed in an epoxy resin precursor, and the dispersion was then solidified. The solidified solid was polished, and the cross section of the negative electrode active material composite was observed with a SEM to examine the shape of cracks on a picture.

(Measurement of Porosity)

For the obtained negative electrode active material composite powder, a pore volume was measured using a mercury penetration method, and a pore volume per unit weight was calculated. A volume per unit weight of the negative electrode active material composite powder was measured by a liquid replacement pycnometer using ethanol as a measurement solvent, and porosity of the negative electrode active material composite was calculated as (pore volume per unit weight)/(volume per unit weight)×100 [%].

Table 1 shows a discharge capacity and a capacity retention ratio after 200 cycles to a discharge capacity at the initial cycle in the charge-discharge test.

For the following examples and comparative example, results are shown in Table 1 below. For the following examples and comparative example, only aspects different from those of Example 1 are described, and descriptions of other synthesis and evaluation procedures are omitted because they were performed in the same manner as in Example 1.

Example 2

An active material was obtained by performing synthesis in the same manner as in Example 1 except that the amount of a SiO crush-treated powder added at the time of kneading was 4.0 g.

Example 3

An active material was obtained by performing synthesis in the same manner as in Example 1 except that the amount of a SiO crush-treated powder added at the time of kneading was 7.0 g, and the amount of polypropylene fibers was 0.2 g.

Example 4

An active material was obtained by performing synthesis in the same manner as in Example 1 except that the amount of a SiO crush-treated powder added at the time of kneading was 4.0 g, the amount of a graphite powder having an average primary particle size of 3 μm was 0.4 g, the added amount of furfuryl alcohol was 3.0 g, and the amount of polypropylene fibers was 0.2 g.

Example 5

An active material was obtained by performing synthesis in the same manner as in Example 1 except that the amount of a SiO crush-treated powder added at the time of kneading was 4.0 g, the amount of a graphite powder having an average primary particle size of 3 μm was 0.4 g, the added amount of furfuryl alcohol was 3.0 g, and the amount of polypropylene fibers was 0.2 g.

Example 6

An active material was obtained by performing synthesis in the same manner as in Example 1 except that the amount of a SiO crush-treated powder added at the time of kneading was 4.0 g, the amount of a graphite powder having an average primary particle size of 3 μm was 0.4 g, the added amount of furfuryl alcohol was 6.0 g, and the amount of polypropylene fibers was 0.27 g.

Comparative Example 1

An active material was obtained by performing synthesis in the same manner as in Example 1 except that polypropylene fibers were not added at the time of kneading.

TABLE 1

| | Firing temperature [° C.] | Firing time [hours] |
|---|---|---|
| Example 1 | 1100 | 3 |
| Example 2 | 1100 | 3 |
| Example 3 | 1100 | 3 |
| Example 4 | 1100 | 3 |
| Example 5 | 1100 | 3 |
| Example 6 | 1100 | 3 |
| Comparative Example 1 | 1100 | 3 |

| | Average Diameter of Active Material Composite [μm] | Length of Crack [μm] | Si content $[W_{SiO} + W_{Si}]/[W_C + W_{SiO} + W_{Si}]$ [—] | Porosity [%] |
|---|---|---|---|---|
| Example 1 | 33 | 11 | 90 | 9 |
| Example 2 | 32 | 7 | 86 | 10 |
| Example 3 | 39 | 12 | 92 | 12 |
| Example 4 | 29 | 10 | 65 | 21 |
| Example 5 | 33 | 11 | 55 | 14 |
| Example 6 | 36 | 11 | 88 | 28 |
| Comparative Example 1 | 32 | 2 | 90 | 3 |

| | Discharge capacity [mAh/g] | Capacity retention ratio after 100 cycles [%] | Large-current characteristics [%] |
|---|---|---|---|
| Example 1 | 1406 | 85 | 83 |
| Example 2 | 1370 | 88 | 81 |
| Example 3 | 1470 | 79 | 83 |
| Example 4 | 1021 | 91 | 89 |
| Example 5 | 988 | 92 | 91 |
| Example 6 | 880 | 78 | 82 |
| Comparative Example 1 | 1335 | 66 | 88 |

As is evident from Table 1, negative electrodes including the negative electrode active materials of Examples 1 to 6, each of which includes a silicon oxide dispersed in a carbonaceous material and silicon dispersed in the silicon oxide and has a crack having a length equal to or greater than 1/5 of the composite particle size, are excellent in capacity retention ratio at the 100th cycle and large-current characteristics, and have a long life. In contrast, the negative electrode active material of Comparative Example 1 in which a crack is not formed beforehand has a lower capacity retention ratio at the 100th cycle as compared to Examples 1 to 6.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A negative electrode active material for a nonaqueous electrolyte secondary battery, the negative electrode active material comprising:

a carbonaceous material;

a silicon oxide phase in the carbonaceous material; and a silicon phase in the silicon oxide phase, wherein the negative electrode active material has a crack having a first end in the carbonaceous material including the silicon oxide phase, and a side of the crack has a length L equal to or greater than ⅕ of a diameter D1 of the negative electrode active material, and the crack includes a second end that is opened to an outer surface of-the carbonaceous material including the silicon oxide phase, wherein the silicon phase is covered by the silicon oxide phase, and wherein the silicon oxide phase is covered by the carbonaceous material having the crack.

2. The material according to claim 1, wherein where a mass of the carbonaceous material is WC, a mass of the silicon oxide phase is WSiO and a mass of the silicon phase is WSi, WC, WSiO and WSi satisfy 0.85<[WSiO+WSi]/[WC+WSiO+WSi]≤0.95.

3. The material according to claim 1, wherein the negative electrode active material has a crack in the carbonaceous material, and a ratio (L/D) of the longest side L to a diameter D of the crack is 10 or more.

4. The material according to claim 1, wherein the porosity of the negative electrode active material is 5% or more to 25% or less.

5. A nonaqueous electrolyte secondary battery comprising: a negative electrode containing a negative electrode active material; a positive electrode containing a positive electrode active material; and a nonaqueous electrolyte, the negative electrode active material comprising:

a carbonaceous material;

a silicon oxide phase in the carbonaceous material; and a silicon phase in the silicon oxide phase, wherein the negative electrode active material has a crack having a first end in the carbonaceous material including the silicon oxide phase, and a side of the crack has a length L equal to or greater than ⅕ of a diameter D of the negative electrode active material, and the crack includes a second end that is opened to an outer surface of the carbonaceous material including the silicon oxide phase, wherein the silicon phase is covered by the silicon oxide phase, and wherein the silicon oxide phase is covered by the carbonaceous material having the crack.

6. The battery according to claim 5, wherein where a mass of the carbonaceous material is WC, a mass of the silicon oxide phase is WSiO and a mass of the silicon phase is WSi, WC, WSiO and WSi satisfy 0.85<[WSiO+WSi]/[WC+WSiO+WSi]≤0.95.

7. The battery according to claim 5, wherein the negative electrode active material has a crack in the carbonaceous material, and a ratio (L/D) of the longest side L to a diameter D of the crack is 10 or more.

8. The battery according to claim 5, wherein the porosity of the negative electrode active material is 5% or more to 25% or less.

9. A battery pack which uses a nonaqueous electrolyte secondary battery comprising: a negative electrode containing a negative electrode active material; a positive electrode containing a positive electrode active material; and a nonaqueous electrolyte, the negative electrode active material comprising:

a carbonaceous material;

a silicon oxide phase in the carbonaceous material; and a silicon phase in the silicon oxide phase, wherein the negative electrode active material has a crack including a first end in the carbonaceous material including the silicon oxide phase, and a side of the crack has a length L equal to or greater than ⅕ of a diameter D of the negative electrode active material, and the crack includes a second end that is opened to an outer surface of the carbonaceous material including the silicon oxide phase, wherein the silicon phase is covered by the silicon oxide phase, and wherein the silicon oxide phase is covered by the carbonaceous material having the crack.

10. The battery pack according to claim 9, wherein where a mass of the carbonaceous material is WC, a mass of the silicon oxide phase is WSiO and a mass of the silicon phase is WSi, WC, WSiO and WSi satisfy 0.85<[WSiO+WSi]/[WC+WSiO+WSi]≤0.95.

11. The battery pack according to claim 9, wherein the negative electrode active material has a crack in the carbonaceous material, and a ratio (L/D) of the longest side L to the diameter D of the crack is 10 or more.

12. The battery pack according to claim 9, wherein the porosity of the negative electrode active material is 5% or more to 25% or less.

13. The material according to claim 1, wherein the carbonaceous material includes graphite.

14. The battery according to claim 5, wherein the carbonaceous material includes graphite.

15. The battery pack according to claim 9, wherein the carbonaceous material includes graphite.

16. The material according to claim 1, wherein the negative electrode active material are particles, and the outer surface of the carbonaceous material including the silicon oxide phase is an outer surface of the particles being the negative electrode active material.

17. The battery according to claim 5, wherein the negative electrode active material are particles, and the outer surface of the carbonaceous material including the silicon oxide phase is an outer surface of the particles being the negative electrode active material.

18. The battery pack according to claim 9, wherein the negative electrode active material are particles, and wherein the outer surface of the carbonaceous material includes the silicon oxide phase is an outer surface of the particles being the negative electrode active material.

* * * * *